US012158257B1

(12) United States Patent
Liu et al.

(10) Patent No.: US 12,158,257 B1
(45) Date of Patent: Dec. 3, 2024

(54) HANDHELD LIGHTING DEVICE WITH ADJUSTABLE LIGHTING DIRECTION

(71) Applicant: Shenzhen Obuy Technology Co., Ltd, Shenzhen (CN)

(72) Inventors: Xiaowei Liu, Shenzhen (CN); Shuju Zhou, Shenzhen (CN); Qin Chen, Shenzhen (CN)

(73) Assignee: Shenzhen Obuy Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/583,065

(22) Filed: Feb. 21, 2024

(30) Foreign Application Priority Data

Nov. 9, 2023 (CN) ........................ 202311487874.X

(51) Int. Cl.
*F21V 19/02* (2006.01)
*F21L 4/04* (2006.01)
*F21V 17/10* (2006.01)
*F21V 23/06* (2006.01)

(52) U.S. Cl.
CPC .............. *F21V 19/02* (2013.01); *F21L 4/045* (2013.01); *F21V 17/107* (2013.01); *F21V 23/06* (2013.01)

(58) Field of Classification Search
CPC ........ F21V 19/02; F21V 17/107; F21V 23/06; F21V 14/025; F21L 4/045; F21L 4/005
USPC .......................................................... 362/197
See application file for complete search history.

(56) References Cited

U.S. PATENT DOCUMENTS 5,541,822 A * 7/1996 Bamber ................ F21V 21/406 362/202
8,777,446 B2 * 7/2014 Sharrah ................... F21V 21/08 362/255
2011/0149562 A1 * 6/2011 Spartano ................ F21L 4/027 362/197
2017/0292659 A1 * 10/2017 Bayat ...................... F21L 4/045

* cited by examiner

*Primary Examiner* — Laura K Tso
(74) *Attorney, Agent, or Firm* — Jeenam Park

(57) ABSTRACT

The present disclosure provides a handheld lighting device with adjustable lighting direction. The handheld lighting device has a housing assembly having a handle and a bracket with a steering groove, a lamp head assembly supported by the housing assembly and including a lamp head main shell and a rotating leg extending from the main shell toward the housing assembly, the rotating leg being received in the steering groove such that the lamp head assembly is deflected relative to the housing. The handheld lighting device is in a first lighting state when the direction of lighting of the lens of the lamp head assembly is in the same direction as the lengthwise of the handle. The handheld lighting device is in a second lighting state when the direction of lighting of the lens of said lamp head assembly deviates from the lengthwise direction of the handle.

19 Claims, 9 Drawing Sheets

HANDHELD LIGHTING DEVICE WITH ADJUSTABLE LIGHTING DIRECTION

CROSS-REFERENCE TO RELATED APPLICATIONS

The present disclosure claims priority to Chinese Patent Application No. 202311487874.X, filed on Nov. 9, 2023, the content of which is incorporated herein by reference in its entirety.

TECHNICAL FIELD

The present disclosure relates to the field of lighting devices, and in particular to a handheld lighting device that facilitates the user to adjust the lamp head so that it shines in any irradiation direction.

BACKGROUND

Handheld lighting devices have become indispensable lighting tools in daily life, and the handheld lighting devices are widely used in maintenance, sports, rock climbing, camping, running and other scenarios. Flashlights are common mobile lighting device. The flashlight usually shines only in a straight line in the direction of the main body of the flashlight.

In the related technology, the handheld lighting device includes a housing assembly and a lamp head assembly with a lens mounted on the housing assembly, and the lamp head assembly is used to emit light by the lens, and people use the light emitted from the lamp head assembly to achieve the purpose of lighting in different application scenarios. However, the position of the lamp head assembly relative to the shell assembly in the related technology is fixed, and the use of a single form results in a small lighting range of the handheld lighting device, which causes inconvenience in use. For this reason, how to effectively optimise the form of use of the handheld lighting device in order to expand the lighting range of the handheld lighting device has become an issues to be solved.

SUMMARY

In view of this, the present disclosure is designed to provide a handheld lighting device, which can solve the defect that a single form of use of the handheld lighting device in the related technology leads to a small lighting range of the handheld lighting device.

The handheld lighting device with adjustable lighting direction comprises a housing assembly, a lamp head assembly and a circuit board assembly, the housing assembly having a handle in which a battery is provided and the lamp head assembly which is compatible with the handle, the handle having an accommodating cavity extending and recessed in a length direction of the handle, a portion of the lamp head assembly received in the accommodating cavity, and a light-transmitting lens located in a direction of the lamp head assembly away from the accommodating cavity, the circuit board assembly located in the accommodating cavity and being electrically connected to the lamp head assembly, and the lamp head assembly being rotatable with respect to the housing assembly, so as to make the lighting device has a first lighting state and a second lighting state, the lighting device being in the first lighting state when the plane in which said light-transmitting lens surface is located is parallel to the plane in which a window of the accommodating cavity is located, and the lighting device being in the second lighting state when the plane in which said light-transmitting lens surface is located intersects the plane in which the window of the accommodating cavity is located.

BRIEF DESCRIPTION OF DRAWINGS

Many aspects of the embodiment can be better understood with reference to the following drawings. The components in the drawings are not necessarily drawn to scale, the emphasis instead being placed upon clearly illustrating the principles of the embodiment.

DESCRIPTION OF EMBODIMENTS

Figure 1:
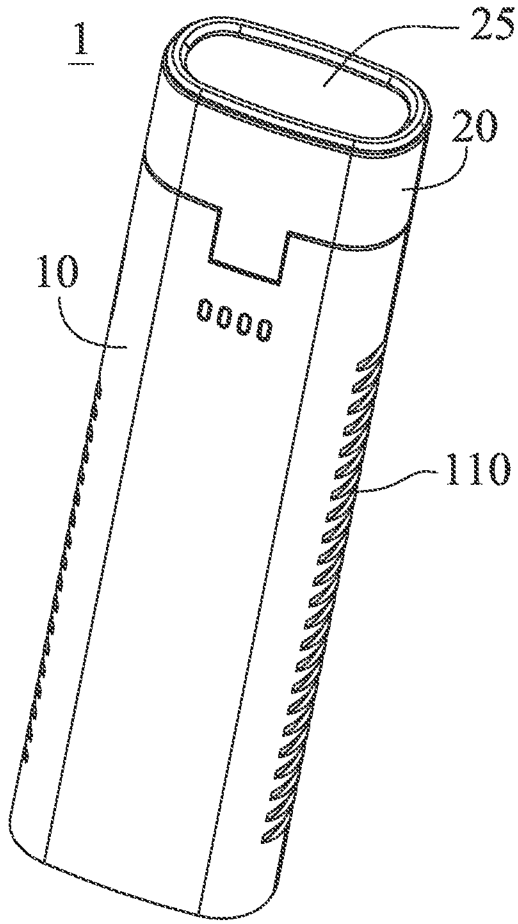
FIG. 1 is an isometric view of a handheld lighting device in accordance with an exemplary embodiment of the present disclosure.
Figure 2:
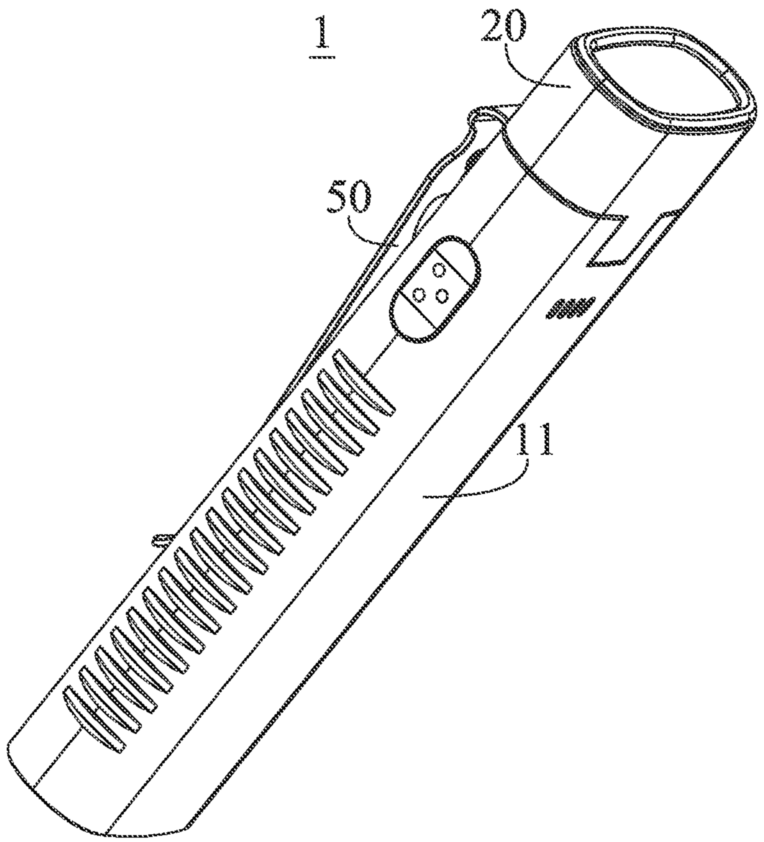
FIG. 2 is an isometric view of the handheld lighting device in FIG. 1 in a first lighting state.
Figure 3:
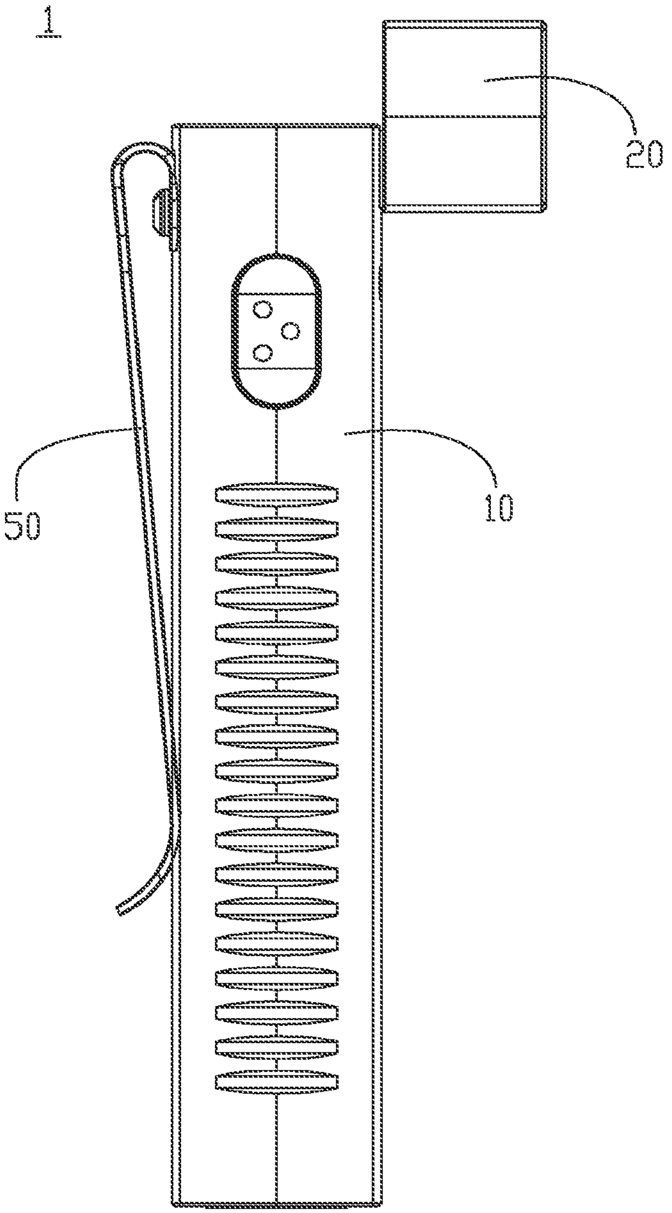
FIG. 3 is an isometric view of a lamp head assembly of the handheld lighting device in FIG. 1 rotated to its maximum angle in a second lighting state.

Embodiment of the present disclosure will be described in detail in conjunction with the drawings. It should be noted that the figures are illustrative rather than limiting. The figures are not drawn to scale, do not illustrate every aspect of the described embodiment, and do not limit the scope of the present disclosure.

In the disclosure, the terms "first" and "second" are only used for descriptive purposes and cannot be understood as indicating or implying relative importance or implicitly indicating the number of indicated technical features. Thus, the features defined with "first" and "second" can explicitly or implicitly include one or more of the features. In the description of the invention, "multiple" means two or more, unless otherwise specifically defined.

It is appreciated that the shape of each part described below is "rectangular", "square" indicates a rough shape, and there may be rounded corners between adjacent sides or no rounded corners. Furthermore, the azimuth relationship qualifiers such as "parallel", "vertical", "consistent direction", "same direction", "opposite direction", etc. used by each component described below indicate the approximate orientation that allows for a certain error.

Referring to FIGS. 1 to 10, a handheld lighting device 1 for lighting is provided. The handheld lighting device 1 includes a housing assembly 10, a lamp head assembly 20, and a circuit board assembly 30. The housing assembly 10 has a handle 110 in which a battery is provided and the lamp head 20 assembly which is compatible with the handle 110. The handle 110 has an accommodating cavity 111 with one window 1110. The lamp head assembly 20 is only partially housed in the accommodating cavity 111, and the main body of the lamp head assembly 20 is mounted on the handle 110 in the direction of the window towards the accommodating cavity 111. The light head assembly 20 has a light-transmitting lens 25 for transmitting light from a LED 220, and the circuit board assembly 30 is disposed within the accommodating cavity 111 and is electrically connected to the light head assembly 20. The light head assembly 20 may rotate relative to the handle 110 to enable the handheld lighting device 1 to have a first and a second lighting state. In the first lighting state, the plane in which the light-transmitting lens is located and the plane in which the window 1110 of the holding cavity 111 is located, which are parallel or overlapping each other. In the second lighting state, the lamp head assembly 20 deviates, and the plane where the light-transmitting lens 25 is located intersects with the plane where the window containing the cavity 111 is located.

The housing assembly 10 serves as a shell body of the handheld lighting device 1 and may be reasonably selected according to the actual needs. In this embodiment, the housing assembly 10 is shaped in the form of a cylinder or the like, when used as the handle 110 for easy grip. One end of the handle 110 is an opening window for housing the lamp head assembly 20 and the circuit board assembly 30. The material of housing component 10 is not limited to plastic or metal, and the specific shape of the handle 110 is not limited here. Reasonable selection or design may be made according to actual needs.

The accommodating cavity 111 of the handle 110 is a hollow region, and the specific shape of the accommodating cavity 111 is not limited in this embodiment, but may be reasonably designed according to actual needs. The cross-section of the holding cavity 111 along a direction perpendicular to its extension may be round, oval or rectangular, etc.

The lamp head assembly 20 serves as a light-emitting unit of the handheld lighting device 1, only a portion of which is disposed within the accommodating cavity 111 of the handle 110. In this way, the lamp head assembly 20 may deflect the lamp housing assembly 10 over a right distance and direction.

The lamp head assembly 20 has the light-transmitting lens 25, the light-transmitting lens 25 being used for a light source to pass through the surface of the lens for irradiating a longer distance and for improving lighting efficiency. Meanwhile, the light-transmitting lens 25 may also protect the light source. In this embodiment, the lens 25 is disposed at the top of the lamp head assembly 20. In the first lighting state, the lens is substantially perpendicular to the handle 110.

The circuit board assembly 30 serves as the electrical control body of the handheld lighting device 1, which electrically controls the operation of the lamp head assembly 20, lighting up or extinguishing the light source of the lamp head assembly 20.

In the first lighting state, the plane in which the light-transmitting lens 25 is located is parallel to the plane in which the window 1110 of the accommodating cavity 111 is located, at which time the light projected from the light-transmitting lens 25 of the headlamp assembly 20 is substantially along the direction parallel to the extension direction of the accommodating cavity 111, or at which time the direction of irradiation projected from the light-transmitting lens 25 of the headlamp assembly is substantially perpendicular to the plane in which the window of the accommodating cavity 111 is located. In fact, the term window herein refers to the open of the accommodating cavity 111.

In the second lighting state, the plane in which the transmitting lens 25 is located intersects the plane in which the window of the accommodating cavity 111 is located, at which point the light projected from the transmitting lens of the lamp head assembly 20 is at an angle substantially along the direction of extension with the accommodating cavity 111. In this embodiment, the angle has a maximum angle of 90°.

Based on the handheld lighting device 1 in the embodiment of the present disclosure, by designing the lamp head assembly 20 to be rotatable relative to the handle 110 of the housing assembly 10, the handheld lighting device 1 has different first lighting states and second lighting states, which may be adjusted by the user according to the needs of the scene in which the user is actually located.

Figure 4:
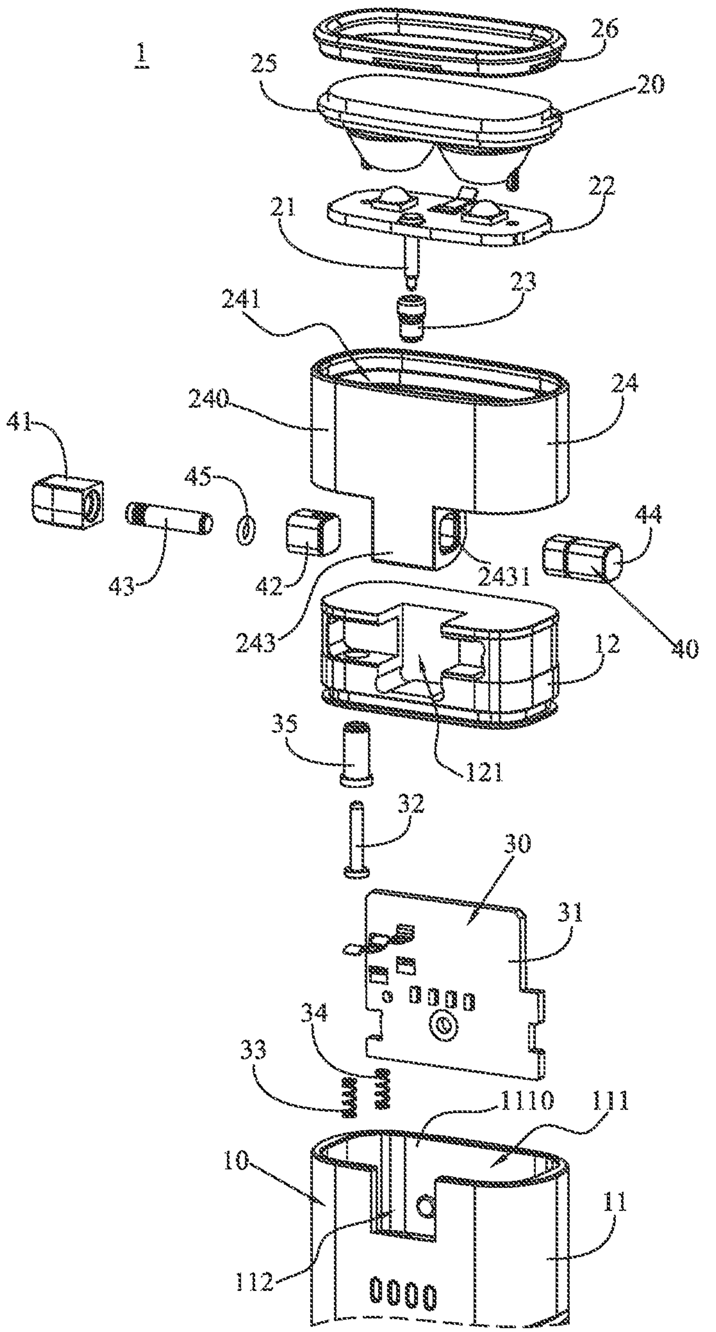
FIG. 4 is an isometric exploded view of the handheld lighting device in FIG. 1, viewed from another aspect.
Figure 5:
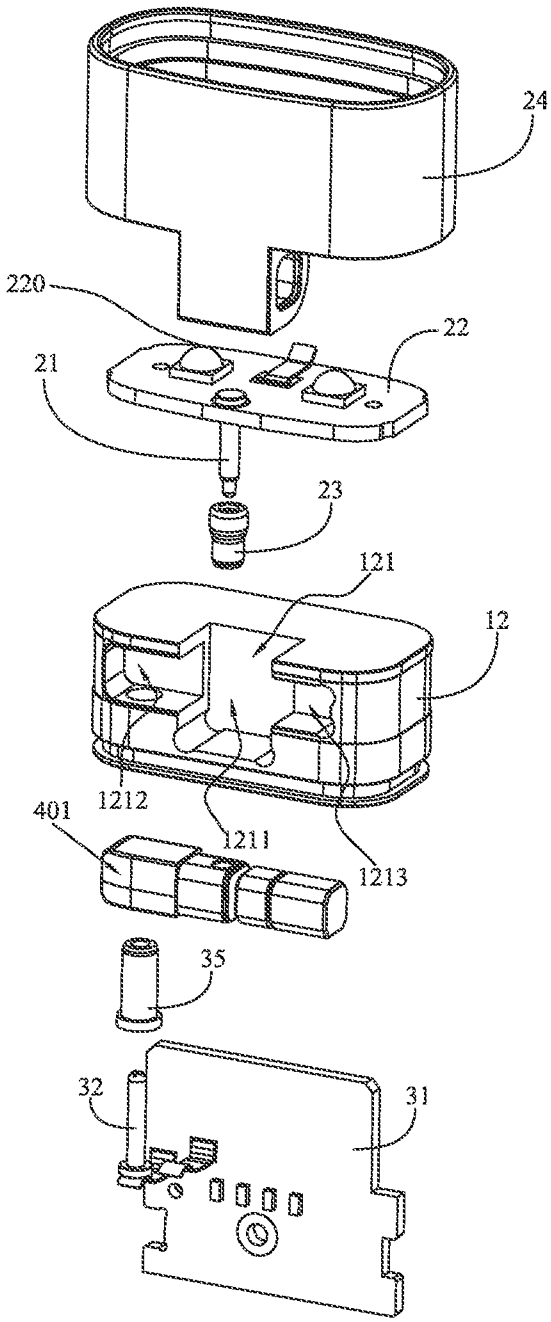
FIG. 5 is an isometric exploded view of the handheld lighting device in FIG. 4, viewed from another aspect with the handle and a portion of the lamp head assembly is removed.
Figure 6:
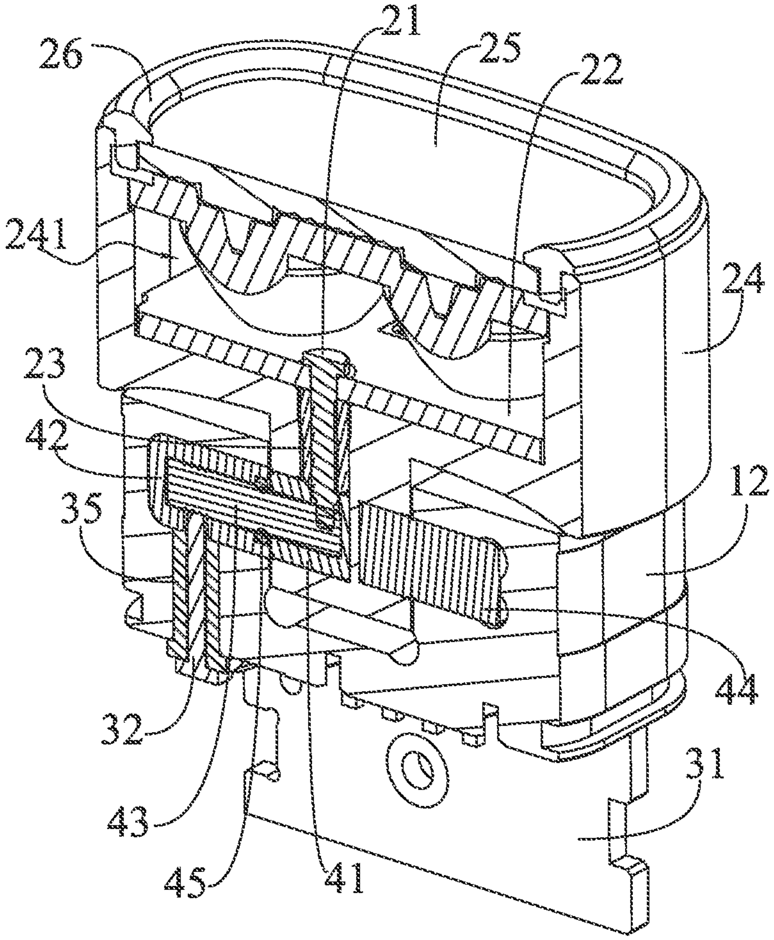
FIG. 6 is a cross-sectional view of the lamp head assembly of the handheld lighting device in FIG. 3.
Figure 7:
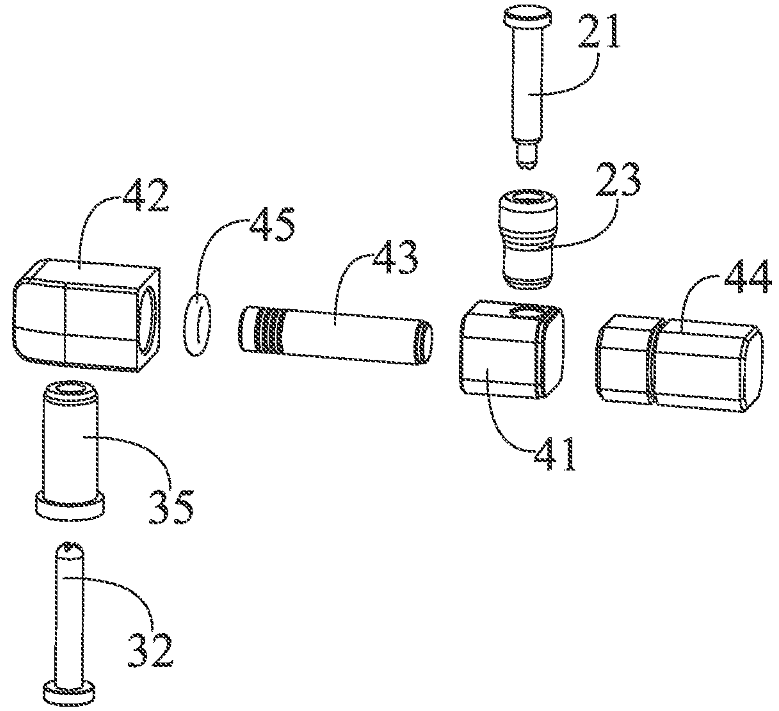
FIG. 7 is an isometric exploded view of an electrically connected assembly of the handheld lighting device in FIG. 1.
Figure 8:
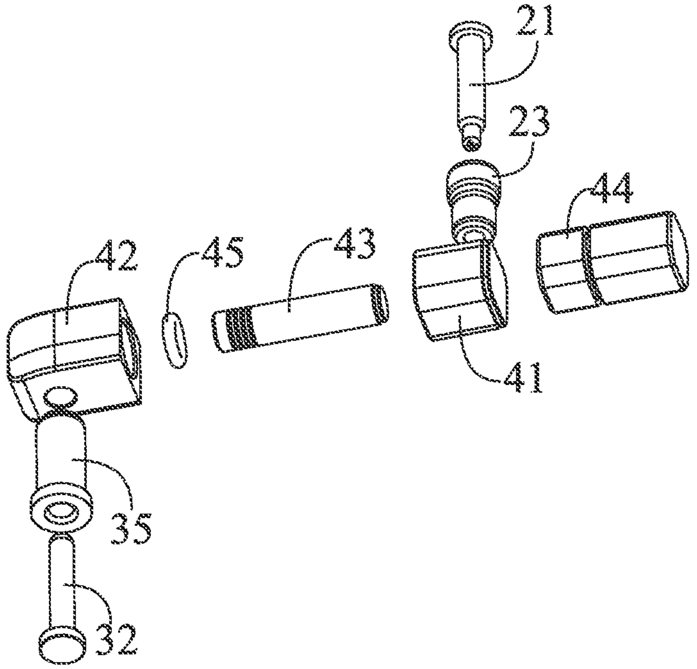
FIG. 8 is an isometric exploded view of the electrically connected assembly of the handheld lighting device in FIG. 7, viewed from another aspect.
Figure 9:
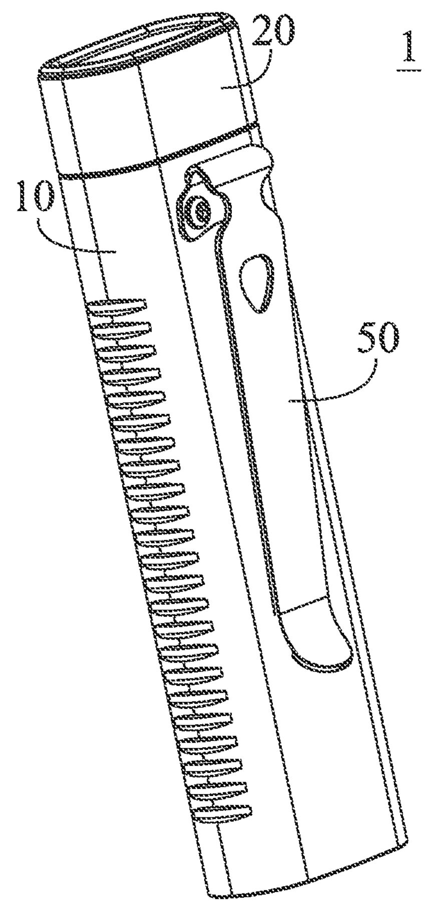
FIG. 9 is an isometric view of the handheld lighting device in FIG. 1, viewed from another aspect.

Referring to FIG. 4, specifically, the housing assembly 10 includes a housing 11 which serves as the handle 110 and a bracket 12. The bracket 12 matches and is disposed within the accommodating cavity 111 of the housing 11. The bracket 12 is provided with a steering groove 121 in its lateral orientation. Only a portion of the lamp head assembly 20 extends into the steering groove 121 and is movably coupled to the bracket 12 via a damping shaft 44 such that the lamp head assembly 20 rotates in the lateral orientation to the bracket 12.

In the embodiment, in order to make the structure of the lighting device 1 more reliable, a letting window 112 is provided at a certain place where the accommodating cavity 111 is surrounded by the wall of the housing 11, and the letting window 112 being interconnected with the accommodating cavity 111. In this embodiment, in order to make the structure of the lighting device 1 more reliable, a letting window 112 is provided somewhere where the accommodating cavity 111 is surrounded by the wall of the housing 11. In other words, the letting window 112 is a notch in the lateral orientation of the housing assembly 10. The notch is interconnected with the accommodating cavity 111 and partially overlaps with the steering groove 121 of the bracket 12.

The steering groove 121 of the bracket 12 has three grooves including a first groove 1211, a second groove 1212 and a third groove 1213. The first groove 1211 is located between the second groove 1212 and the third groove 1213, and the grooves adjacent to each other are interconnected. The length of the first groove 1211 along the length of the handle 110 is greater than the length of the second groove 1212 and the third groove 1213.

While the housing 11 and the bracket 12 are assembled together, the first groove 1211 overlaps the letting window 112 such that the first groove 1211 is exposed so as to be visible. The second groove 1212 and the third groove 1213 are covered by the walls of the housing 11. The first groove 1211, the second groove 1212 and the third groove 1213 are all opened in a lateral orientation of the bracket 12 such that the lamp head assembly 20 may be rotated in that lateral orientation direction relative to the length of the handle 110.

In the present disclosure, the circuit board assembly 30 is disposed within the accommodating cavity 111. The circuit board assembly 30 is supported by the bracket 12 and is secured within the housing 11 to electrically connect the battery and lamp head assembly 20. The circuit board assembly 30 has a circuit board 31, a conductive element 32, a positive element 33 and a negative element 34 electrically connected to the battery in the housing 11, and an insulating sleeve 35 disposed over the conductive element 32.

The lamp head assembly 20 includes a lamp head main shell 24, the lens 25 disposed on the lamp head main shell 24, a cover 26 for protecting the lens 25, an LED circuit board 22 and a first conductive unit 21 disposed on the LED circuit board 22 for electrically connecting the circuit board assembly 30. The lamp head main shell 24 has a side wall 240, a cavity 241 surrounded by the side wall 240 and a rotating leg 243 extending from the side wall 240 in a direction away from the lens 25 and towards the steering groove 121. The rotating leg 243 may be inserted into the first groove 1211 and rotated up to 90° by means of a connecting assembly 40 and centered thereon. The rotating leg 243 has a positioning hole 2431 at the end for receiving the connecting assembly 40. The LED circuit board 22 and the first conductive unit 21 is received in the cavity 241 of the lamp head main shell 24.

In the present disclosure, the connecting assembly 40 includes the damping shaft 44 and an electric connecting shaft component 401. One end of said damping shaft 44 is disposed in the third groove 1213 and the other end is disposed in a positioning hole 2431 in the rotating leg 243. Similarly, one end of the electric connecting shaft component is disposed in the second groove 1212 and the other end is disposed in a positioning hole 2431 in the rotating leg 243. In the embodiment, one end of the electric connecting shaft component is a first insulating seat 41 disposed in the second groove 1212, the other end is a second insulating seat 42 disposed in a positioning hole 2431 in the rotating leg 243. An electrically conductive shaft 43 is wrapped by two insulating seats 41 and 42. In order to avoid mutual wear, a sealing ring 45 is located between the two insulating seats 41 and 42. The conductive shaft 43 is a metal cylinder which may be rotated relative to the two insulating seats 41 and 42. The damping shaft 44 is basically not in direct contact with the electric connecting shaft component and do not interfere with each other. The damping shaft 44 has the shape of a polygonal cylinder that has diagonal prisms with a diameter distance between them that is greater than a distance between the mutually parallel prisms. In the embodiment, the damping shaft 44 is a six-sided prismatic cylinder or an eight-sided prismatic cylinder made of a polymer material or plastic or the like with good deformability property.

It follows that while assembled, the lamp head assembly 20 is designed to change the direction of lighting of the lens 25 by means of the damping shaft 44, and is electrically connected by the electric connecting shaft component 401 on the other side, and the structure is sealed to protect against moisture. In other words, the damping shaft 44 and the electrical connection shaft component 401 are installed on both sides of the rotating leg 243, respectively. The bracket 12 is assembled with the handle 110 of the column type, and the first groove 1211 overlapping the window 1110 is exposed in a lateral orientation. The lamp head assembly 20 is supported by the bracket 12 or the housing 11 of the housing assembly 10, depending on whether the bracket may be fully stowed by the housing 11. The rotating leg 243 projecting from the lamp head assembly 20 extends into the first groove 1211 to be received. In the first lighting state, the rotating leg 243 is completely accommodated in the first groove 1211 that the lens 25 of the lamp head assembly 20 is perpendicular to each other and the lengthwise direction of the handle 110. In other words, both the lens assembly 20 and the handle are maintained in the lengthwise direction, and the light emitted from the lens 25 is in the same lengthwise direction as that of the handle 110. In the second lighting state, the rotating leg 243 at least partially protrudes from the first groove 1211 such that the direction of light from the lens 25 is offset from the direction of the length of the handle 110, so that the user may adjust the direction of illumination of the lamp head with a maximum adjustment angle of no more than 90°. Certainly, the lighting angle may be adjusted, depending on the angle at which the rotating leg 243 of the lamp head deviates from the length direction of the first groove 1211.

Furthermore, the light head assembly 20 is in the first lighting state or the second lighting state, the LED circuit board 22 of the lamp head assembly 20 is sequentially connected to the circuit board assembly 30 and battery inside the housing assembly 10 via the first conductive unit 21 and the electric connecting shaft component 401 housed in the second groove 1212. Specifically, the first insulating seat 41 and the second insulating seat 42 are socketed at each end of the electrically conductive shaft 43, respectively. These three parts are rotatable with respect to each other. The first conductive unit 21 extends along the length of the rotating leg 243 toward and is connected to the electrical conduction shaft 43. In the embodiment, the first conductive unit 21 is a metal conductive post which is wrapped in a protective sleeve 23 piercing the second insulating seat 42 electrically connecting the electrically conductive shaft 43. The second insulating seat 42 rests against the rotating leg 243 and rotates synchronously with the rotating leg 243. The conductive element 32 pierces the first insulating seat 41 and the bracket 12 for electrically connecting to the electrically conductive shaft 43 and the circuit board assembly 30, respectively. The above circuit connection structure is reliable against moisture.

On the other side, one end of the damping shaft 44 is snapped into the third groove 1213 of the bracket 12, and the other end is snapped into a positioning hole 2431 on the rotating leg 243. The damping shaft 44 rotates synchronously with the rotation of the rotating leg 243. In order that the lamp head assembly 20 may be maintained in different lighting directions, the peripheral surface of the damping shaft 44 is frictionally seated in the third groove 1213. Specifically, the damping shaft 44 has the shape of a polygonal prism that has diagonal prisms with a diameter distance between them that is slightly greater than the distance between the mutually parallel prisms. The damping shaft 44 is a six-sided prism or an eight-sided prism.

The third groove 1213 has a substantially rectangular slot hole, a width of the rectangular slot hole being substantially equal to the distance between the parallel flutes of the damping shaft 44. When the lamp head main body 24 operates in different angle directions, the lamp head main body 24 rotates using the damping shaft 44 as the rotation point. During the rotation process, due to the damping shaft 44 having multiple parallel edges, these edges are stuck by the third groove 1213. When the damping shaft 44 bears an external force greater than the frictional force borne by the edge, it rotates to another frictional engagement state, so that the lighting direction of the lamp head assembly 20 is adjusted.

The first insulating seat 41 and the second insulating seat 42 may be made of an insulating material such as plastic, rubber or the like. Similarly, the damping shaft 44 may be made of an abrasion resistant deformable material such as plastic or rubber. The damping shaft 44 may be fixedly connected to the bracket 12 by means of plugging or gluing, etc. The damping shaft 44 is adapted to generate torque to increase damping.

The handheld lighting device 1 is in the first lighting state, then the lighting direction of the lamp head assembly 20 is substantially the same as the length direction of the handle 110. User twists the lamp head assembly 20 to offset it to one side of the housing assembly 10, the lamp head assembly 20 rotates to drive the damping shaft 44 to rotate. Simultaneously, on the other side of the end of the rotating leg 243, the electric connecting shaft component 401 rotates, so that the lighting direction of the lamp head assembly deviates from the length direction of the handle 110 to put the lighting device 10 in the second lighting state, and the angle between the rotating leg 243 and the length direction of the handle 110 is not more than 90°, which already meets the needs of the lighting device 1 in multiple application environments.

The circuit board assembly 30 includes the positive element 33 and the negative element. One end of the positive element 33 is fixedly connected to the housing 11, and the other end of the positive element 33 is in contact with a positive contact of the circuit board 31. One end of the negative element 34 is fixedly connected to the housing 11, and the other end of the negative element 34 is in contact with a negative contact of the circuit board 31. The positive contact of the circuit board 31 is electrically connected to the conductive element 32, and the negative contact of the circuit board 31 is in contact with the bracket 12.

The positive element 33 may, but is not limited to, be a spring or a shrapnel. The positive element 33 is removably connected to the housing 11, or it may be fixedly connected to the housing 11 by one or more of snap-fit, screw-fit, or plug-fit. In the case of a non-detachable connection between the positive element 33 and the housing 11, the positive element 33 may be, but is not limited to, fixedly connected to the housing 11 by means of a glued connection. The negative element 34 may be a spring or a shrapnel which having a similar configuration to the positive element 33.

Further in other embodiment, the sealing ring 45 may also be mounted between the conductive shaft 43 and the second insulating seat 42. The sealing ring 45 may be a rubber seal or a silicone seal. The sealing ring 45 provides good water and dust resistance, and may also increase the damping of the rotation of the lamp head assembly 20.

The handheld lighting device 1 further comprises a hooker 50, the hooker 50 being detachably connected to the housing assembly 10. The hooker 50 may be fixedly connected to the housing 11 of the housing assembly 10 by means of locking screws, whereby the user may hook the entire handheld lighting device 1. For example, the user's belt with the aid of the hooker.

In the present disclosure, the lens 25 of the lamp head assembly 20 is configured to more efficiently diffuse light from the LED circuit board. The plane in which the lens 25 is located is substantially perpendicular to a center axis of the lamp head assembly 20. This means that the lens 25 is substantially perpendicular to the lengthwise direction of the handle 110. In the first lighting state, the center axis of the lamp head assembly 20 is substantially parallel to the lengthwise direction of the handle 110, so the lengthwise direction of the handle 110 is the lighting direction of the lamp head assembly 20.

The lamp head assembly 20 is rotated to one side with the damping shaft 44 such that the rotating leg 243 is displaced from the first groove 1211. Since the damping shaft 44 is polygonal in shape such that the lamp head assembly 20 may remain resting in different positions relative to the handle 110. This means that the direction of lighting of the lens 25 changes and the lighting device 1 is in a second lighting state.

While the present disclosure has been described with reference to a specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

What is claimed is:

1. A handheld lighting device with adjustable lighting direction comprising a housing assembly, a lamp head assembly and a circuit board assembly, wherein the housing assembly has a handle in which a battery is provided and the lamp head assembly which is compatible with the handle, the handle having an accommodating cavity extending and recessed in a length direction of the handle, a portion of the lamp head assembly being received in the accommodating cavity, and a light-transmitting lens being located in a direction of the lamp head assembly away from the accommodating cavity, the circuit board assembly being located in the accommodating cavity and being electrically connected to the lamp head assembly, and the lamp head assembly being rotatable with respect to the housing assembly, so as to make the lighting device has a first lighting state and a second lighting state;

when the plane in which the light-transmitting lens is located is parallel to the plane in which a window of the accommodating cavity is located, the lighting device is in the first lighting state;

the lighting device is in a second lighting state when the plane in which the light-transmitting lens is located intersects the plane in which the window of the accommodating cavity is located; and the housing assembly includes a housing which serves as the handle, a bracket which matches and is disposed within the accommodating cavity of the housing, and the lamp head assembly has a rotating leg being housed and supported within a steering groove of the bracket.

2. The handheld lighting device as described in claim 1, wherein the steering groove of the bracket has a first groove, a second groove and a third groove, the first groove being located between the second groove and the third groove, and adjacent grooves being interconnected.

3. The handheld lighting device as described in claim 2, wherein the second groove and the third groove are covered by the housing, and a letting window is provided on the side orientation of the housing, the letting window overlapping the first groove and exposed to be visible.

4. The handheld lighting device as described in claim 3, wherein a damping shaft is received in the third groove, one end of which is movably seated in the third groove and the other end of which abuts against the end of the rotating leg of the lamp head assembly.

5. The handheld lighting device as described in claim 4, wherein the rotating leg of the lamp head assembly has a positioning hole which receives the damping shaft, the damping shaft rotates synchronously with the rotation of the rotating leg, and the end of the rotating leg disposed in the third groove is frictionally seated against the third groove.

6. The handheld lighting device as described in claim 5, wherein the damping shaft is in the shaped of a polygonal prism.

7. The handheld lighting device as described in claim 4, wherein an electric connecting shaft component is disposed within the second groove and is configured to electrically connect the lamp head assembly to the circuit board assembly disposed within the housing.

8. The handheld lighting device as described in claim 7, wherein the electric connecting shaft component has a first insulating seat disposed in the second groove, a second insulating seat abutted against the rotating leg, and an electrically conductive shaft wrapped by two insulating seats.

9. The handheld lighting device as described in claim 8, wherein the first insulating seat, the second insulating seat and the electrically conductive shaft are rotatable relative to each other.

10. The handheld lighting device as described in claim 7, wherein the lamp head assembly includes a lamp head main shell and the rotating leg extending from the main shell toward the handle, an LED circuit board and a first conductive unit are received in the main shell.

11. A handheld lighting device with adjustable lighting direction comprising a housing assembly, a lamp head assembly with a lens and a circuit board assembly, wherein the housing assembly includes a housing which serves as a handle, a bracket matched and disposed in the housing, the bracket having an exposed and visible steering groove disposed in a lateral orientation;

the lamp head assembly is supported by the housing assembly and has a lamp head main shell and a rotating leg extending from the main shell toward the housing of the housing assembly, the rotating leg being receivable in the steering groove such that the lamp head assembly is deflected relative to the housing;

the handheld lighting device is in a first lighting state when the direction of lighting of the lens of the lamp head assembly is in the same direction as the lengthwise of the handle;

the handheld lighting device is in a second lighting state when the direction of lighting of the lens of said lamp head assembly deviates from the lengthwise direction of the handle.

12. The handheld lighting device as described in claim 11, wherein the steering groove of the bracket has a first groove, a second groove and a third groove, the first groove being located between the second groove and the third groove, and adjacent grooves being interconnected.

13. The handheld lighting device as described in claim 12, wherein the second groove and the third groove are covered by the housing, and a letting window is provided on the side orientation of the housing, the letting window overlapping the first groove and exposed to be visible.

14. The handheld lighting device as described in claim 12, wherein a damping shaft is received in the third groove, one end of which is movably seated in the third groove and the other end of which abuts against the end of the rotating leg of the lamp head assembly.

15. The handheld lighting device as described in claim 14, wherein the rotating leg of the lamp head assembly has a positioning hole which receives the damping shaft, the damping shaft rotates synchronously with the rotation of the rotating leg, and the end of the rotating leg disposed in the third groove is frictionally seated against the third groove.

16. The handheld lighting device as described in claim 14, wherein the damping shaft is in the shaped of a polygonal prism.

17. The handheld lighting device as described in claim 12, wherein an electric connecting shaft component is disposed within the second groove and is configured to electrically connect the lamp head assembly to the circuit board assembly disposed in the housing.

18. The handheld lighting device as described in claim 17, wherein the electric connecting shaft component has a first insulating seat disposed in the second groove, a second insulating seat abutted against the rotating leg, and an electrically conductive shaft wrapped by two insulating seats.

19. The handheld lighting device as described in claim 18, wherein the first insulating seat, the second insulating seat and the electrically conductive shaft are rotatable relative to each other.

* * * * *